W. A. SEELEY & H. M. VETTERLEIN.
ANIMAL TRAP.
APPLICATION FILED MAY 8, 1914.
1,139,587.
Patented May 18, 1915.
3 SHEETS—SHEET 1.
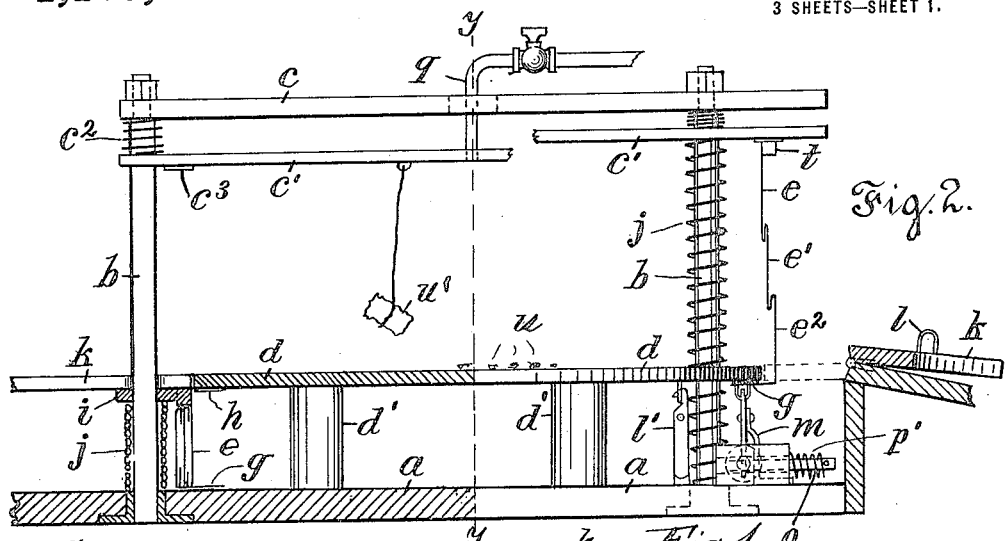
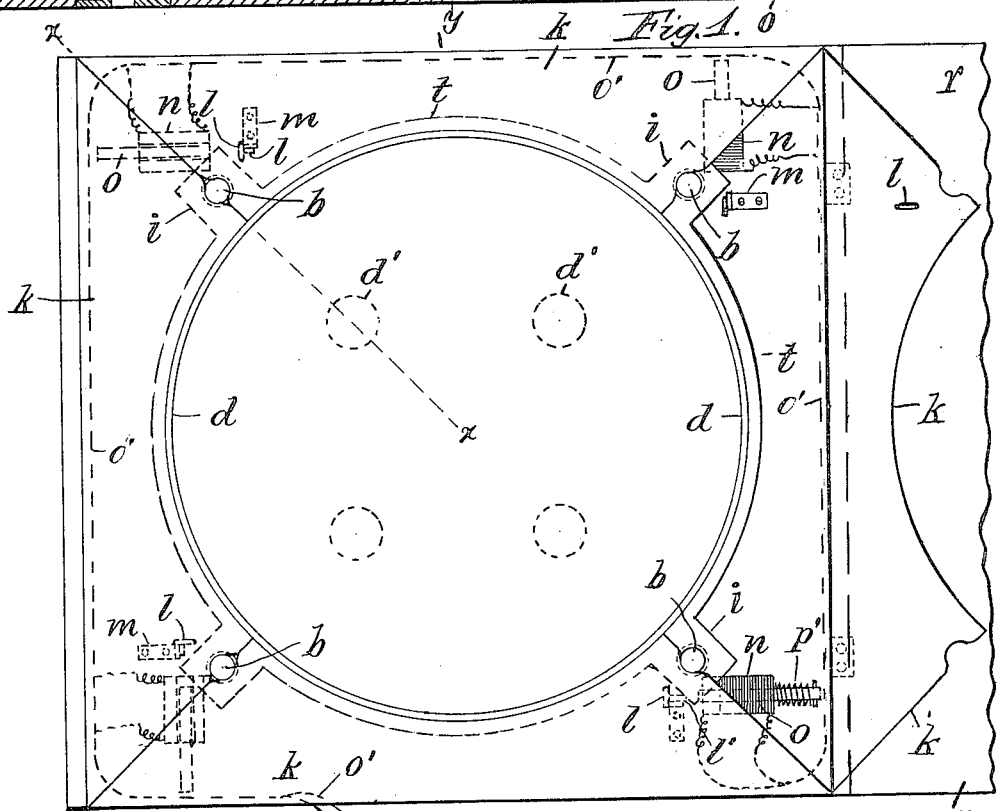

W. A. SEELEY & H. M. VETTERLEIN.
ANIMAL TRAP.
APPLICATION FILED MAY 8, 1914.
1,139,587.
Patented May 18, 1915.
3 SHEETS—SHEET 2.
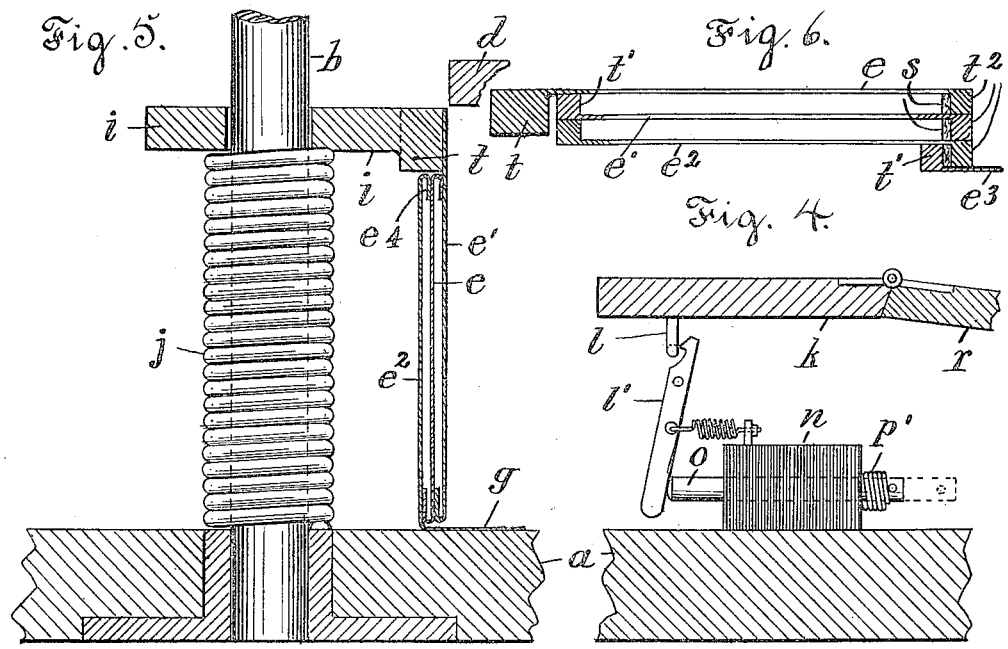

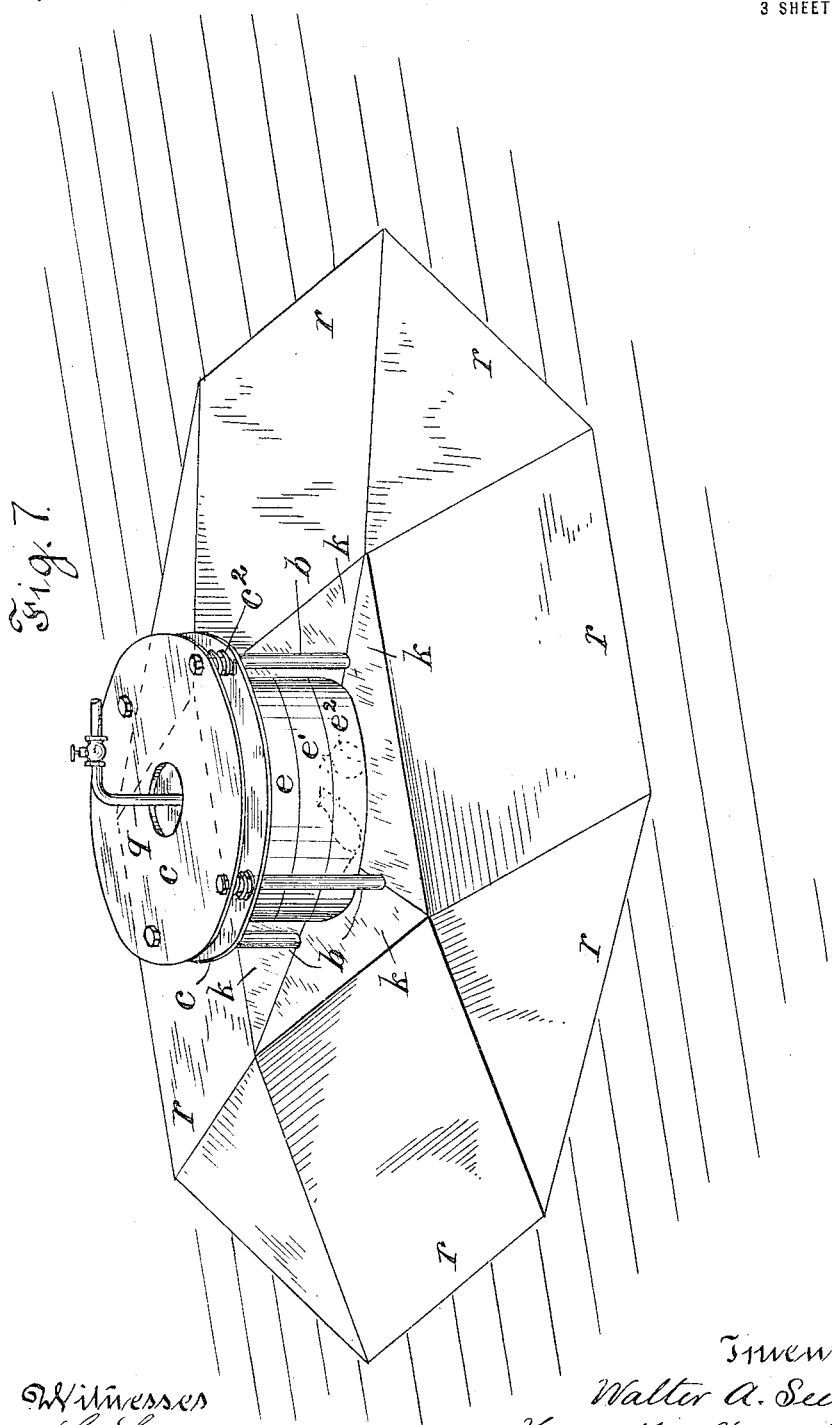

UNITED STATES PATENT OFFICE.

WALTER A. SEELEY AND HENRY M. VETTERLEIN, OF NEWARK, NEW JERSEY.

ANIMAL-TRAP.

1,139,587.

Specification of Letters Patent. Patented May 18, 1915.

Application filed May 8, 1914. Serial No. 837,355.

*To all whom it may concern:*

Be it known that we, WALTER A. SEELEY, residing at 65 Nelson Place, Newark, county of Essex, and State of New Jersey, and HENRY M. VETTERLEIN, residing at 105 Columbia avenue, Newark, county of Essex, and State of New Jersey, both citizens of the United States, have invented certain new and useful Improvements in Animal-Traps, fully described and represented in the following specification and the accompanying drawings, forming a part of the same.

The object of this invention is to furnish a platform to which rats or other animals may be attracted by bait, and to confine the animals in a tight chamber upon the platform, into which gas or a volatile poisonous liquid can be injected to kill the animals in the trap. This object is attained by supporting a roof above the bait-platform and mounting a drum below the level of the platform with means for moving it upwardly past the margin of the platform into contact with the roof, thus forming a closed chamber upon the platform when the drum is elevated, into which chamber the rat poison can be injected by a jet-pipe extended through the roof.

The invention includes means for elevating the drum, means for locking the drum in its inoperative position and releasing the same when desired, and means for packing the joints of the drum with the platform and the roof to form a tight chamber between the same.

The apparatus is provided with a base-board or bed-plate upon which the platform is sustained, runways extended therefrom to the level of the base so that when the apparatus is set upon a floor or table the bait-platform may be readily accessible to the rats. The roof is preferably placed at a considerable distance, as half a yard, above the bait-platform, to give an aspect of openness to the space in which the bait is placed, and to avoid raising the platform above the base-board a similar amount, the drum is preferably made in two or three telescopic sections, so that when inoperative it can be confined below the level of the platform, but when raised may fully inclose the space above the same. The several joints of the sections in such a telescopic drum are preferably provided with packings to keep the joints tight and confine the poisonous gas to the chamber when the drum is elevated.

The invention will be understood by reference to the annexed drawing, in which—

Figure 1 is a plan of the platform and the adjacent parts with one of the hinged flaps thrown open; Fig. 2, at the right hand side of the center line $y$—$y$, is shown in elevation with the drum raised, the view being partly in section, where hatched; and at the left hand side of the line $y$—$y$, Fig. 2 shows an elevation in section where hatched, on line $x$—$x$ in Fig. 1. Fig. 3 is a plan of the apparatus with the runways broken away for want of room upon the drawing; Fig. 4 is an elevation of one of the locking devices with the base-board and the flap in section; Fig. 5 is a vertical section, where hatched, of a telescopic drum and its spring-lifter on line $x$—$x$ in Fig. 1; Fig. 6 shows an alternative construction for the joints of the telescopic drum; and Fig. 7 is a perspective view of the apparatus with sloping runways at the sides and corners.

The base-plate $a$ is shown with four posts $b$ projected upwardly therefrom and connected at the top by a head-piece $c$. The bait-platform $d$ is supported upon the base by legs $d'$ at a suitable height to permit the location of the drum below the level of the platform.

A telescopic drum is shown formed of cylindrical sections to slide upon one another, to avoid raising the platform unnecessarily, and thus making the runways $r$ less sloping. The sections are marked $e$, $e'$, $e^2$, $e^3$, and in Fig. 5 are shown formed with hooks $e^4$, and the upper section with a strong ring $t$ to which lugs $i$ are attached; but Fig. 6 shows an alternative construction in which the sections are formed at their upper end with rings $t'$, and at their lower end with rings $t^2$, between which annular packings $s$ are inserted to make a tight joint when the sections are extended, as shown in Fig. 7.

The bottom section has a circular flange $g$ which is adapted to fit below the edge of the platform $d$ when the drum is raised, and to contact with a packing-ring $h$. Lugs $i$ are projected from the drum and fitted movably to the posts $b$, and springs $j$ are fitted between the lugs and the base-plate $a$ to extend the drum upwardly. A roof-piece $c'$ is fitted movably to the posts $b$ just below the head-piece $c$, and is pressed normally downward by light springs $c^2$ and provided upon its under side with an annular packing-ring or seat $c^3$, against which the top of the drum presses when elevated.

The drum is held in an inoperative position below the platform by a locking device which may be applied directly to the lugs $i$, but is shown in the drawing applied to four flaps $k$ which are hinged to supports upon the base-plate intermediate to the four posts, and which flaps are fitted to the margin of the platform and, when turned toward the same, lie over the top of the lugs so that the locking of the flaps holds the lugs and drum from flying upwardly.

The locking device is shown as a staple $l$ upon the under side of the flap and a hook-lever $l'$ mounted upon a standard $m$ upon the base.

A solenoid magnet $n$ is fixed upon the base adjacent to each hook and the magnets connected in multiple to electric circuit wires $o'$ actuated by a switch $p$.

The cores $o$ of the magnets are retracted partly from the bore of the solenoid by a spring $p'$, and the closing of the electric circuit impels the cores with considerable momentum against the hook-levers $l'$, thus unlatching them all simultaneously from the staples upon the flaps. Such release of the flaps permits the springs to push the drum upwardly, the lugs $i$ operating to throw the flaps backwardly, as shown at the right hand side of Fig. 2, and thus throwing any animal from the path of the rising drum, which might otherwise crowd the animal against the roof and spoil the joint of the drum therewith.

The downward movement of the roof $c'$ is limited by shoulders upon the posts $b$, and when the drum rises it makes an elastic impact upon the packing $c^3$ and forces the roof upwardly until the flange $g$ strikes the lower side of the platform $d$, where it makes a tight joint with the packing $h$.

The springs $j$ are made strong enough to overcome all the resistance of the other elements, and where packings are fitted at the joints of the telescopic sections, as at $s$ in Fig. 6, the inclosure of the space between the platform and roof is made very tight so as to confine any gas that is introduced through the jet-pipe $q$.

The device is intended to be made with a drum of three, four or more feet diameter so that the platform may accommodate a considerable number of animals, and the trap is intended to be watched by an observer behind a blind, who can operate the electric button or switch, and cause the drum to spring upwardly whenever he desires.

It is immaterial whether the drum be unlocked by an operator or by connection with an alarm clock which would release it at a given hour, or by the movement of the bait when grasped by the animal. It is preferable that an operator should actuate the trap, as it is thus possible where there are many rats to avoid releasing the trap when entered by the first animal, as the operator can delay until a considerable number are assembled upon the platform before permitting the drum to fly upward. When the drum is elevated, the animals are safely confined and can be killed by introducing the poisonous gas or volatile liquid through the jet-pipe $q$.

The bait may be scattered upon the platform $d$ as shown at $u$ in Fig. 2, or suspended from the roof $c'$, as shown at $u'$ in the same figure. It is immaterial what means are used to attract the animals to the platform. the drum may be made square, or any other preferred form.

Having thus set forth the nature of the invention what is claimed herein is:

1. In an animal trap, the combination, with a bait-platform and a roof over the same, of a drum sustained below the level of the platform and adapted to move upwardly and inclose the space between the platform and the roof, and packings for making a tight joint between the drum at the platform and roof.

2. In an animal trap, the combination, with a bait-platform and a roof over the same, of a drum sustained below the level of the platform, means for moving the drum upwardly to inclose the space between the platform and the roof, and a connection for injecting a volatile poison into such space when the drum is raised.

3. In an animal trap, the combination, with a bait-platform and a roof held permanently over the same, of a drum sustained below the level of the platform and adapted to move vertically upward and inclose the space between the platform and the roof, posts adjacent to the exterior of the drum, lugs projected from the top of the drum and encircling the posts, springs fitted to the posts beneath the lugs to elevate the drum, means for holding the drum locked in its lowest position, and means for unlocking the drum when desired.

4. In an animal trap, the combination, with a bait-platform and a roof held permanently over the same, of a drum sustained below the level of the platform adapted to move vertically upward past the margin of the platform into contact with the roof, springs for normally elevating the drum, flaps hinged upon the base-board and fitted over the upper edge of the drum to hold it in its lowest position, locking devices for the several flaps to hold the drum locked, and means operated by hand for unlocking the flaps and permitting the springs to lift the drum.

5. In an animal trap, the combination, with a bait-platform and a roof held permanently over the same, of a telescopic drum having packings at the joints of its sections and sustained below the level of the platform, means for moving the drum upwardly against the roof, and means for packing the joint of the end-section with the platform and the roof respectively to confine a gas or vapor within the drum.

6. In an animal trap, the combination, with a base-board, of a bait-platform supported upon the same, a drum sustained below the level of the platform, posts exterior to the drum supporting a roof, springs upon the posts connected with the upper end of the drum, flaps hinged upon the base-board and fitted around the edge of the platform above the drum and locked over the drum to hold it inoperative, and electrically-operated means for unlocking the flaps and releasing the drum.

In testimony whereof we have hereunto set our hands in the presence of two subscribing witnesses.

WALTER A. SEELEY.
HENRY M. VETTERLEIN.

Witnesses:
 JAMES W. GREENBONE,
 THOMAS S. CRANE.

Copies of this patent may be obtained for five cents each, by addressing the "Commissioner of Patents, Washington, D. C."